Feb. 14, 1950 — D. C. WEISS — 2,497,427
NIGHT LANDING VISUAL LOCALIZER AND GLIDE PATH INDICATOR
Filed July 14, 1948 — 2 Sheets-Sheet 1

INVENTOR.
David C. Weiss
BY
Mawhinney & Mawhinney
Attorneys

Feb. 14, 1950 D. C. WEISS 2,497,427
NIGHT LANDING VISUAL LOCALIZER
AND GLIDE PATH INDICATOR
Filed July 14, 1948 2 Sheets-Sheet 2

INVENTOR.
David C. Weiss
BY
Mawhinney & Mawhinney
Attorneys

Patented Feb. 14, 1950

2,497,427

UNITED STATES PATENT OFFICE 2,497,427

NIGHT LANDING VISUAL LOCALIZER AND GLIDE PATH INDICATOR

David C. Weiss, Williamsburg, Va.

Application July 14, 1948, Serial No. 38,736

7 Claims. (Cl. 177—352)

1

The present invention relates to improvements in night landing visual localizer and glide path indicator and has for an object to provide a visual night landing aid for aircraft which will provide the pilot of such aircraft with a definite visual reference to a fixed path of final approach for a night landing.

Another object of the present invention is to provide a system which makes it possible for the pilot of an aircraft approaching the runway for a landing to realize at once his relation to a straight line in space which is aligned with the runway for the angle of glide suitable for the particular type of aircraft to be landed and which will enable the pilot to make a perfect final approach to the runway.

A still further object of the present invention is to provide a system of the character described for military use whereby air field illumination is retained to a minimum and the efficiency and accuracy of landing at a maximum.

A still further object of the present invention is to provide a system which may be economically installed at all airports having the conventional runways, side runway lights and control tower and which may be efficiently maintained.

With the foregoing and other objects in view, the invention will be more fully described hereinafter, and more particularly pointed out in the claims appended hereto.

In the drawings, wherein like symbols refer to like or corresponding parts throughout the several views, Figure 1 is a perspective view of an aircraft in a position of final approach for landing on a runway under the present invention.

2

Figure 9:
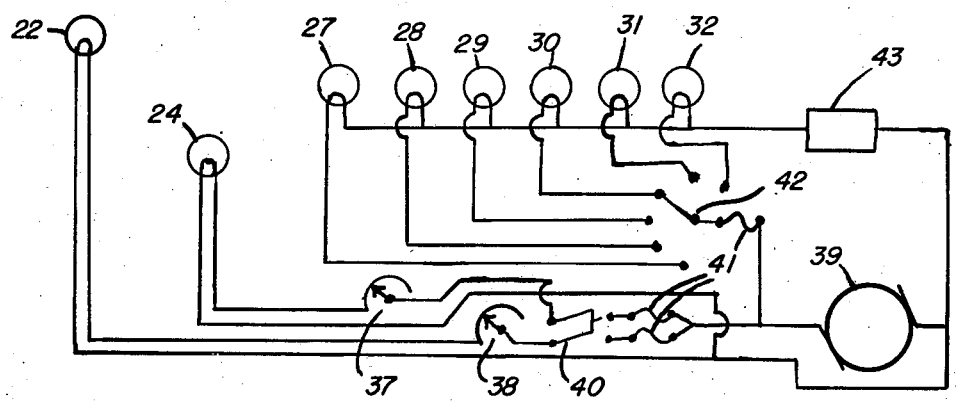

Figure 9 is a schematic wiring diagram of a form of the present invention.

Figure 10:
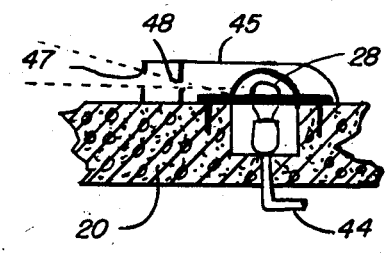

Figure 10 is a fragmentary longitudinal section of the runway showing a form of masking of the glide path indicating lights on the center of the runway.

Figure 11:
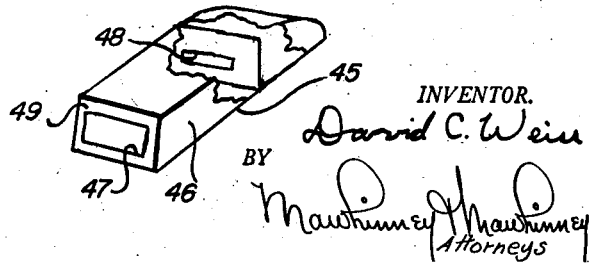

Figure 11 is a perspective view with parts broken away and parts shown in section of a form of glide path indicating light masking hood.

Figure 1:
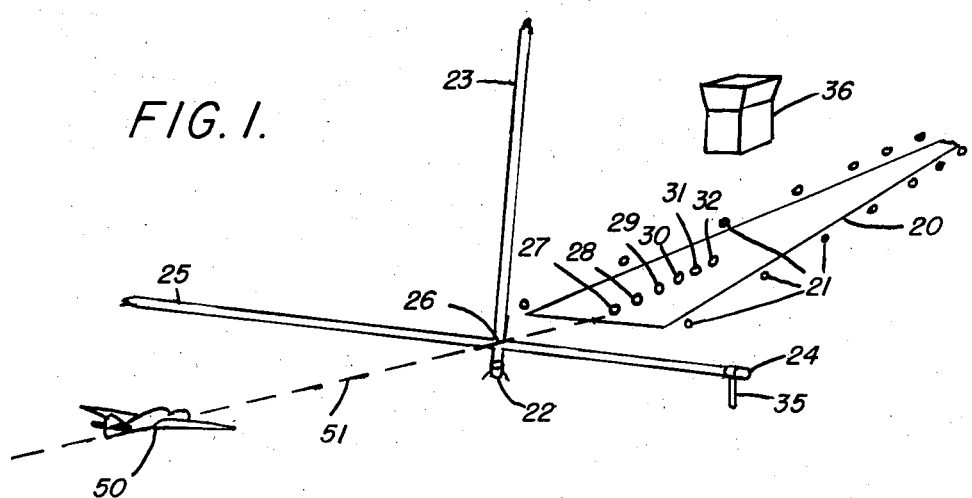
Figure 2:
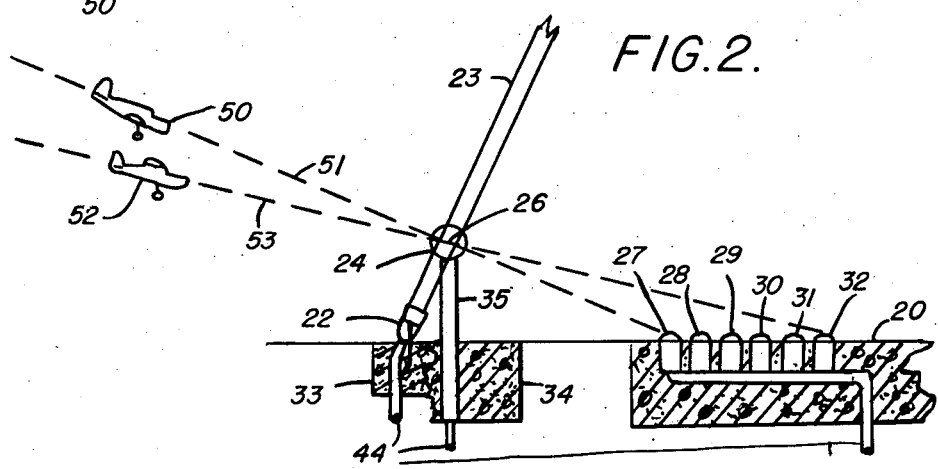
Figure 2 is a fragmentary longitudinal section with parts broken away and parts shown in section of a runway and spot light anchoring mechanism as employed in connection with the present invention.

Referring more particularly to the drawings Figures 1 and 2, 20 designates the conventional runway having side lights 21 spaced therealong. A stationary vertical spot light 22 is spaced from one end of the runway and in alignment with the center line of such runway. The vertical spot light 22 delivers a vertical beam 23 which is in vertical alignment with the center of the runway 20. A stationary horizontal spot light 24 is removed spatially from the end of the runway and so disposed as to generate a horizontal beam 25 which is horizontal to the surface of the runway 20. The beams of lights 23 and 25 intersect one another at a point 26. It will be noted in Figure 2 that the stationary vertical spot light is inclined toward the runway at an angle somewhat less than 90°. This angle of inclination is for a purpose described more fully hereinafter. A plurality of glide path indicating lights 27 through 32 inclusive are spaced apart along the center line of the runway 20, the distance between such glide path indicating lights being determined by the angle of glide desired with reference to the intersecting point 26 of the vertical and horizontal beams 23 and 25 respectively. In one embodiment of the present invention lamp 27 provides together with beams 23 and 25 a glide path angle of 14½° whilst lights 28 through 30 provide glide path angles of 2° less for each lamp, namely lamp 28 provides a glide angle of 12½° and lamp 29 will be 10½° and lamp 30 will be 8½°.

The vertical spot light 22 is secured to an anchorage 33 whilst the horizontal spot light is secured to an anchorage 34 having a vertical upstanding tower 35 for carrying the horizontal light.

The entire system is actuated from the control tower 36 from which it will be noted that there are provided rheostats 37 and 38 in series with the vertical and horizontal lamps 22 and 24 respectively which are employed to balance the spot lights so their light beams 23 and 25 have the same intensity at their point of intersection 26. The lamps 22 and 24 are connected to a source of electrical energy 39 by means of a double pole single throw switch 40 and are protected against overload by fuses 41.

The glide path indicating lamps 27 through 32 inclusive are connected in parallel with a rotary selector switch 42 and are communicated with a source of electrical energy 39 and protected against overload therefrom by fuses 41. A flasher unit 43 is placed in series with the parallel glide path indicating lamps such that whenever one lamp is energized it will continuously flash at a recommended one-half a second intervals. It will be noted from Figure 9 that only one of the glide path indicating lights may be energized at a time.

Referring more particularly to Figures 10 and 11, there is shown a form of masking hood for the glide path indicating lights when employed for military use and which provides a hood 45 which has side walls 46 and a front wall 47 provided with slits 48 and 49 therethrough. This together with annular masks placed about the covers of the vertical and horizontal spot lights 22 and 24 respectively will provide an image similar to that shown in Figure 3 without the dangerous illumination of the entire air field. It will be appreciated that the friendly aircraft who will employ this system for guidance in landing will be instructed as to the location of the air strip and the angle of glide path designated to be used and can immediately make an approach and landing without the necessity for momentarily lighting up the entire field at which time any enemy observation plane which might be in the area could chart the position of the field.

With reference to Figures 3 through 8 inclusive the border of the runway 20 has been shown in solid lines for purposes of clarity but it will be understood that these lines would be defined by the runway side lights 21.

In operation the system functions as follows. The operator in the control tower 36 upon the radio call from an approaching aircraft 50 will close switch 40 thereby energizing the vertical and horizontal spot lights 22 and 24 respectively at which time by means of rheostats 37 and 38 the beam intensities 23 and 25 of the spot lights will be balanced at their point of intersection 26. The pilot will communicate with the operator in the tower, hereinafter referred to as operator, and inform him as to the desired angle of glide. As it will be appreciated, for most commercial aircraft of the two engine type or larger, a very steep glide path will be employed and upon instruction to the operator from the pilot that it is desired to come in on a glide path of 14½° the operator will turn the rotary selector switch 42 to energize lamp 27 which will intermittently flash and when the pilot is descending upon the runway on the proper glide path the flashing glide path indicating lamp 27 will be at the point of intersection of beams 23 and 25 which is shown as an *. It may be possible that, due to variance in meteorological conditions, the pilot may start the approach at one angle of glide and have to shift to another, at which time he can inform the operator thereof and the operator can, by means of the rotary selector switch 42, switch to the proper glide path indicating light for the angle desired by the pilot.

For instance, a heavy aircraft 50 would approach along the glide path 51 as shown in Figure 2 under the guidance of indicating light 27 whilst a lighter aircraft 52 would approach the runway in a glide path 53 determined by glide path indicating light 32.

It is preferable that the glide path indicating lights be colored and that they also be actuated intermittently in order that they will not blend in with the two beams 23 and 25 but will provide a target with which to align the simulated cross hairs in the form of light beams 23 and 25 respectively. The beam 23 of the vertical spot light 22 is not directed in a perpendicular plane with reference to the runway but is inclined slightly toward the runway as best seen in Figure 2. The angle of inclination is such that the beam 23 will more nearly approach a perpendicular line with reference to the glide path of the aircraft, for instance as shown in Figure 2, glide paths 51 and 53. Upon determination of the general characteristics of aircraft which will be employing a certain runway, the angle of inclination can be determined and set for the mean angle of glide in order that such vertical beam 23 will be relatively perpendicular to the path of glide.

Figure 3:
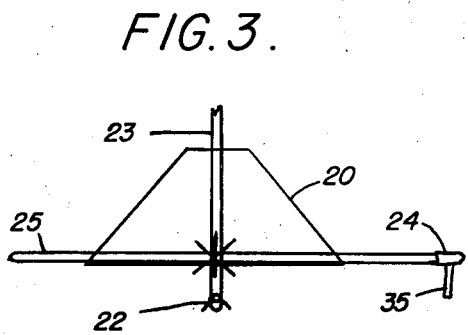
Figure 3 is a view of the runway as seen by the pilot during the final approach for landing and wherein the aircraft is in perfect alignment for its angle of glide path.
Figure 4:
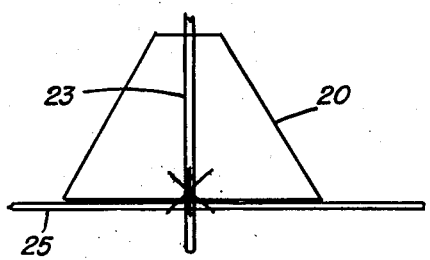
Figure 4 is a similar view where the aircraft is in perfect vertical alignment with the runway but above the horizontal indicated path.
Figure 5:
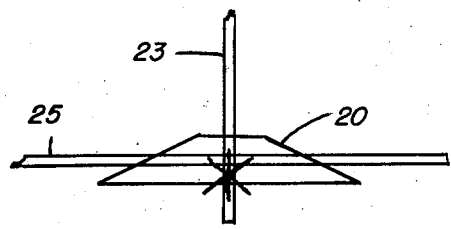
Figure 5 is a similar view wherein the aircraft is below the horizontal path.
Figure 6:
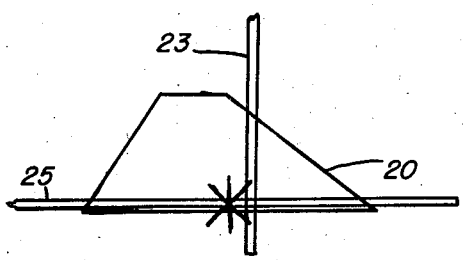
Figure 6 is a view similar to Figure 3 wherein the aircraft is in horizontal alignment but off the vertical line and slightly to the left.
Figure 7:
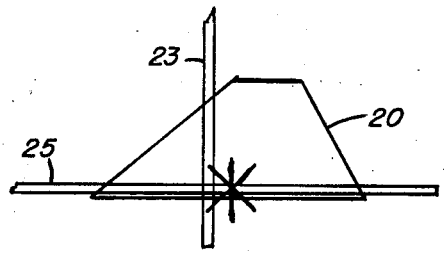
Figure 7 is a similar view to Figure 3 wherein the aircraft is on the horizontal line but off the vertical and slightly to the right.
Figure 8:
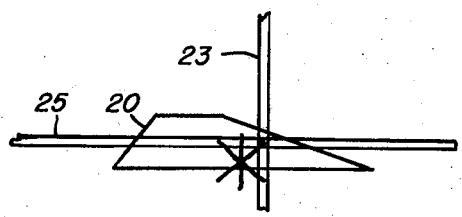
Figure 8 is a view similar to Figure 3 wherein the aircraft is off both the vertical and horizontal line of the proper glide path and is below the horizontal and to the left of the vertical.

Referring more particularly to Figures 3 through 8 inclusive, several views are shown wherein the approaching pilot will view the correct angle of glide in various positions and it may be simulated to the placing of a rifle on a target, for instance in Figure 3 if the pilot observes the air strip 20 and the vertical and horizontal beams 23 and 25 as shown therein in connection with the * which designates one of the glide path indicating lights that pilot is proceeding down the final approach path for a perfect landing and as the plane nears the earth the image before him will disappear at the point of "flaring out" at which time the aircraft is level with respect to the runway prior to the actual contact of the wheels therewith and will be guided for alignment on the runway upon contact by the side lights 21 spaced at predetermined intervals along the runway. The various phaseal views illustrated in Figures 3 through 8 inclusive show how the proper glide path will appear to the pilot if he is slightly off course and it will be readily appreciated that he can immediately, by the proper coordination of the controls, place himself back on the desired final approach as shown in Figure 3. Both of the spot lights 22 and 24 as well as the glide path indicating lamps 27 through 32 inclusive are in communication with the control tower 36 via conduits 44 and it will be appreciated that the rheostats and switches shown schematically in Figure 9 may be arranged upon a single panel placed in the control tower at a convenient point for use by the tower operator in conjunction with the two-way plane to tower radio system.

It will also be appreciated that the present invention may be installed at airports not having a control tower by selecting the glide path indicating light which would give the mean glide path angle for the approach of either small or large craft operating out of such airport. For instance, if at one airport the only type of aircraft flying in and out would be of the light private class, for instance Piper Cubs or Taylor Craft, the glide path indicating light 32 only would be used giving the maximum glide angle, whereas on the other hand if only large craft like the Douglas DC-3 and DC-4 type of aircraft requiring the maximum steep glide angle the lamp 27 could be set.

Although I have disclosed herein the best form of the invention known to me at this time, I reserve the right to all such modifications and changes as may come within the scope of the following claims.

What I claim is:

1. In a night landing visual localizer and glide path indicator adapted for use with an aircraft runway, means for generating a vertical beam of light skywardly from a point along the centerline of the runway, means for generating a horizontal beam of light transversely of the runway, said second mentioned generating means being removed transversely from the runway and positioned to direct its beam of light to intersect the vertical beam, and glide path indicating generating means carried by said runway along the centerline thereof and being spaced from said first and second generating means and the point of intersection thereof a distance necessary to give the desired glide path indication.

2. A device of the character described as claimed in claim 1 characterized by the fact that said vertical beam emanates from a spot light spaced from but along the center line of said runway.

3. A device of the character described as claimed in claim 1 characterized by the fact that said glide path indicating means is a plurality of colored lights spaced apart longitudinally along the center line of said runway and adapted to flash intermittently and to form with said vertical and horizontal beams a target for the angle of glide selected.

4. A device to facilitate night landings on a runway by visual localization during military operations comprising means for generating a substantially vertical beam from the center line of said runway, means for generating a horizontal beam transversely and longitudinally removed from said runway, masking means for said horizontal and vertical beams for restricting sight illumination thereof, glide path indicating lights on the center line of said runway, masking means for said glide path indicating lights, and selective means for selecting a particular glide path indicating light.

5. A night landing visual localizer and glide path indicator adapted to be used with an airport having a runway and control tower, a substantially vertical spot light longitudinally spaced from one end of said runway along the center line thereof, a horizontal spot light transversely and longitudinally removed from said runway, a support tower for said horizontal spot light, glide path indicating means longitudinally spaced apart along the center line of said runway, said glide path indicating lights being connected in parallel circuit, a rotary selector switch for selectively connecting each of said glide path indicating lights in series, said rotary selector switch being in said control tower, circuit interrupter means in said glide path indicating light circuit, and variable beam intensity regulators in said horizontal and vertical spot light circuits, said variable beam intensity regulators being located in said control tower.

6. For use with an airport having the conventional runway and control tower a night landing visual localizer and glide path indicator comprising means for generating a vertical beam of light from a point spaced longitudinally from but along the centerline of said runway, said vertical beam being inclined slightly less than an angle of 90° in a direction towards said runway, means for generating a horizontal beam of light at a point transversely removed from said runway, said horizontal beam adapted to intersect said vertical beam, glide path indicating lights only one of which can be illuminated at a time spaced longitudinally apart along the centerline of said runway, and a selector switch inserted with said glide path indicating lights for selectively illuminating said glide path indicating lights.

7. A device of the character described as claimed in claim 6 wherein said glide path indicating lights are connected in parallel with said selector switch for unitary illumination of said glide path indicating lights.

DAVID C. WEISS.

REFERENCES CITED

The following references are of record in the file of this patent:

UNITED STATES PATENTS

| Number | Name | Date |
| --- | --- | --- |
| 1,998,429 | Andre | Apr. 23, 1935 |
| 2,280,126 | Metcalf | Apr. 21, 1942 |
| 2,296,936 | Logan | Sept. 29, 1942 |
| 2,350,594 | Dallas | June 6, 1944 |
| 2,390,109 | Liebmann | Dec. 4, 1945 |
| 2,400,232 | Hall | May 14, 1946 |
| 2,441,877 | Flett | May 18, 1948 |